United States Patent [19]
Brucker
[11] 3,911,480
[45] Oct. 7, 1975

[54] GENERATING SCREENED HALF-TONES BY SCANNING

[76] Inventor: John P. Brucker, 6178 Tamilynn St., San Diego, Calif. 92122

[22] Filed: Jan. 21, 1974

[21] Appl. No.: 435,334

Related U.S. Application Data

[63] Continuation-in-part of Ser. No. 313,585, Dec. 8, 1972, abandoned.

[52] U.S. Cl. .................... 358/75; 178/6.7 R
[51] Int. Cl.[2] .................... H04N 1/46
[58] Field of Search ........ 178/5.2 A, 5.4 CD, 5.4 R, 178/6.7 R, 7.6, 7.7; 358/75

[56] References Cited

UNITED STATES PATENTS

| | | | |
|---|---|---|---|
| 2,571,322 | 10/1951 | Yelland | 358/75 |
| 3,463,880 | 8/1969 | Corson | 178/7.2 |
| 3,564,130 | 2/1971 | Crooks et al. | 178/6.7 |
| 3,681,650 | 8/1972 | Koll | 315/30 |
| 3,742,129 | 6/1973 | Roberts et al. | 178/5.4 CD |
| 3,803,445 | 4/1974 | Wagner | 178/7.7 X |

*Primary Examiner*—Robert L. Griffin
*Assistant Examiner*—Mitchell Saffian

[57] ABSTRACT

This invention discloses a new and unique means of generating color separation screens simultaneously from a color original by scanning methods. The individual separation screens are each on a square matrix of substantially the same size as all others of the set, and each individual separation screen is rotated at the screen angle most popularly used in commercial color printing. Dot characters are deflected at an angle approximately 45° from the angle of the desired screen pattern.

26 Claims, 18 Drawing Figures

GENERATING SCREENED HALF-TONES BY SCANNING

This is a continuation-in-part of application 313,585 filed Dec. 8, 1972, now abandoned.

BACKGROUND OF THE INVENTION

The art of electronic scanning to produce color separations from color originals is well known and well documented. Briefly, it consists of scanning a color original with a photo-sensor that detects the particular color at each small portion of the image. The photo-sensor converts this color information into a set of electrical signals that represent the relative densities of blue, red and green light that is 'seen' by the sensor. The electrical signals are then processed in electronic circuitry to determine the densities of yellow, cyan, magenta and black inks that need to be printed in that particular spot to reproduce the original color image. The electronic circuitry modulates light sources that are focused on small spots of four separate sheets of photographic film. The small spots on the film are in the same relative position as the particular spot being scanned on the color original.

In order to use these separations for a printing process, they must be in the form of half-tones. That is, the variations in density of each color must be represented by variations in the size of very small dots on a grid matrix pattern. In this manner a printing press can effectively reproduce shades of grey and variations in tone of color.

If all four colors of ink were printed in half-tone with their grid matrices, or screens, in the same direction; objectionable moire' patterns and color distortion would result. Therefore, it is a practice in the industry to rotate the screens with respect to each other. Black is usually screened at 45°, yellow at zero degrees, magenta at plus fifteen degrees and cyan at minus 15°. This combination has been found to give the best and most consistent results.

Prior to this invention, in order to achieve these particular screen angles, it was necessary to either scan all four separations simultaneously in continuous tone and then screen them photographically or to scan them with a screen one at a time.

Either of these options had several disadvantages. In order to scan in continuous tone it was necessary to scan at a pitch much greater than the screen pitch in order to prevent loss of definition in the subsequent screening operation. Continuous tone scanning is usually done at a pitch of either 500 or 1000 lines per inch. This fine scan pitch means that a large amount of time is required to complete the scanning. Additional time must also be spent to then screen each separation at a different angle photographically.

In order to screen scan directly the scanning pitch could be the same as the screen pitch (typically 100 to 150 lines per inch), but the four separations had to be done sequentially with the master image rotated for each different screen angle during scanning. This sequential operation necessarily required much time for setup and scanning changes.

Several attempts have been made in the past to scan and screen all four separations simultaneously. However, all previous attempts have failed to duplicate the ideal screen combination with each screen having the same resolution and having the screen angles of 45°, 0°, plus 15° and minus 15°. See for instance U.S. Pat. Nos. 2,768,577 and 3,664,843.

SUMMARY OF THE INVENTION

This invention describes the discovery that by causing a dot generator to have a deflection at an angle approximately 45° from the angle of the desired screen pattern, simple logic and memory are sufficient to generate a square screen pattern rotated at some angle from the direction of scanning. The use of this 45° deflection allows each dot to have a discrete and constant time in which to be formed.

Color separations of any desired overall size with any desired screen size and screen angle may be made with the techniques of this invention. Since the image is formed one dot at a time a small cathode ray tube may be used to generate large reproductions. Also, since each dot is formed individually, the optics of the system are not critical. Distortions and aberations due to inexpensive optics will slightly change the shape of each dot but will not degrade the appearance of the entire image.

Color reproductions made with the methods of this invention will be indistinguishable from those made with present high quality commercial methods.

In this invention present techniques of screening an original image and correcting the detected light levels for color balance and hue are used to generate four different electrical signals analogous to the densities of primary color inks required to reproduce the original image. The four said electrical signals are then used to modulate the dot size of four separate dot generators. The dot generators are arranged to form dots of various sizes on image receiving sheets in rows of scan lines in scale to the scanning of the original image. The scale may be either one to one or at some fixed ratio. Modulating the sizes of the formed dots by the said electrical signals causes a half-tone pattern to be generated that represents the continuous tone variations of the original image.

Each of the dot generators is caused to have a deflection at some different angle to the scan direction and the amount of the deflection shall be controllable in precise increments. The deflection amount of each dot generator and the timing of the generation of dots of each generator is controlled by electronic circuitry with sufficient logic to cause the dots to be placed at points located on square matrices, each said square matrix being rotated at a different angle from the direction of scanning.

The use of this technique in color separation scanning will permit scanning at the same pitch as the screen pitch while simultaneously generating all four screens of a set of color separations.

OBJECTS OF THE INVENTION

It is an object of this invention therefore, to provide a new and improved means that will allow the generation of a separation screen by electronic scanning that has a screen axis which is rotated at some arbitrary angle to the axis of scanning. It is another object of this invention to provide a means whereby any number of separation screens can be made simultaneously by scanning, each of which will have substantially the same resolution and screen size as all others of the set. Another object of the invention is to show that any arbitrary screen angle and screen size can be generated, to any degree of accuracy, by the techniques of this invention. A further object of this invention is to show how these ends can be achieved in preferred form by the use of relatively straight forward and simple electronic circuitry and logic.

BRIEF DESCRIPTION OF THE DRAWINGS

FIG. 13 shows the basic geometry that the pattern equations are derived from.

DESCRIPTION OF THE PREFERRED EMBODIMENT

Figure 1:
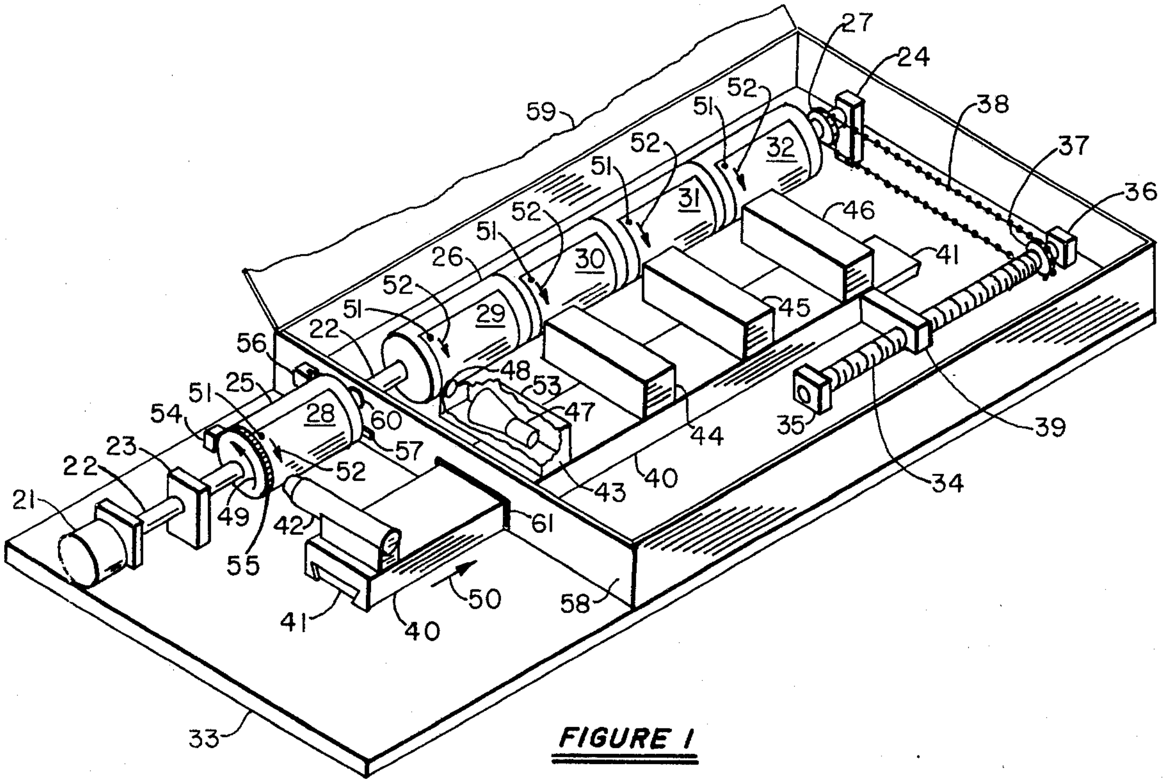
FIG. 1 shows a scanning machine capable of generating four simultaneous half-tone color separation negatives.

Reference is now made to FIG. 1 which is a drawing showing an embodiment of the invention. This includes a first drum 25 on which input copy 28 is mounted. The drum 25 is attached to a rotatably driven shaft 22. The shaft 22 extends to support a long drum 26 on which is attached photographic film 29, 30, 31 and 32 on which the screen pattern separations are to be exposed. The shaft 22 is rotatably supported by pillow blocks 23 and 24 on a suitable base 33 and is driven by motor 21. A drive chain sprocket 27 is attached to shaft 22 and rotates therewith.

The threaded shaft 34 is rotatably supported by pillow blocks 35 and 36. A first driven chain sprocket 37 is attached to threaded shaft 34 and rotates therewith. Drive chain 38 forms a closed loop and passes over drive sprocket 27 and driven sprocket 37 thereby causing threaded shaft 34 to rotate as shaft 22 rotates. Mounted on the threaded shaft 34 is a traveling nut 39 which is threaded so that as the threaded shaft 34 rotates, the traveling nut travels therealong. The traveling nut 39 is firmly attached to the slide 40 causing it to move as the traveling nut moves.

The slide 40 is attached to but allowed to slide linearilly upon the slide base 41. The slide base 41 is attached to the base 33 in a position such that the slide 40 travels along a path that is parallel to the axis of shaft 22.

Mounted to the top of the slide 40 and thusly moving with it are the three color photo sensor 42 and the dot character generators 43, 44, 45 and 46.

The mechanism described thus far is an arrangement for rotating the drums 25 and 26 together and for scanning the input copy 28 in a helical pattern with the three color photo sensor 42; simultaneously with scanning the films 29, 30, 31 and 32 in helical patterns with the dot character generators 43, 44, 45 and 46. As the shaft 22 is rotated in the direction of arrow 49 the slide 40 is caused to travel in the direction of arrow 50. This action causes the input copy 28 and each sheet of film 29, 30, 31 and 32 to be scanned in the scanning direction, represented by arrows 52, from the lower left hand corner of each sheet, represented by dots 51, in horizontal lines from the lower edges of the sheets to their upper edges. Note that as the drum 25 rotates in the direction of arrow 49 the input copy 28 is scanned in the direction of arrow 52, and that arrow 52 is identical to the scan axis base lines as shown in FIGS. 13, 14, 15, 16, 17 and 18.

Figure 2:
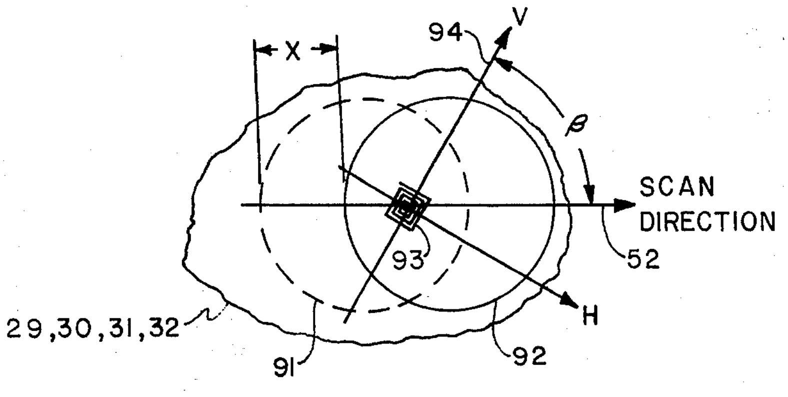
FIG. 2 shows the dot image projected onto a sheet of film on the scanning machine.
Figure 15:
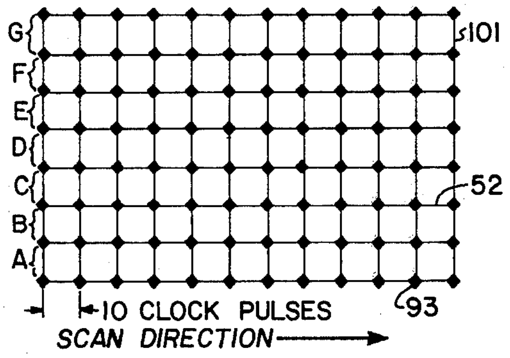
FIG. 15 shows the pattern developed by the yellow screen circuit.
Figure 16:
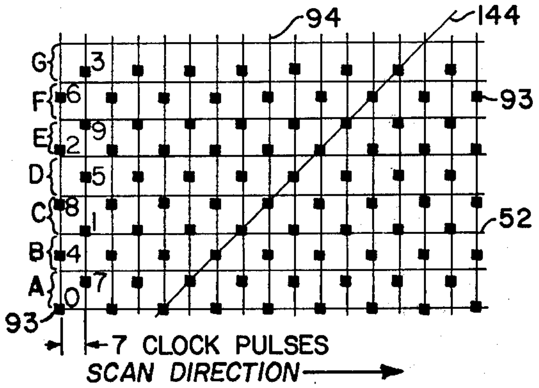
FIG. 16 shows the pattern developed by the black screen circuit.
Figure 17:
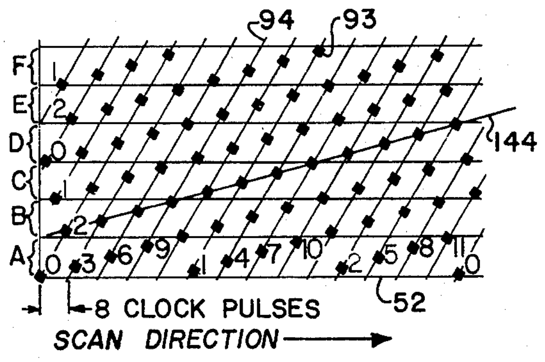
FIG. 17 shows the pattern developed by the magenta screen circuit.
Figure 18:
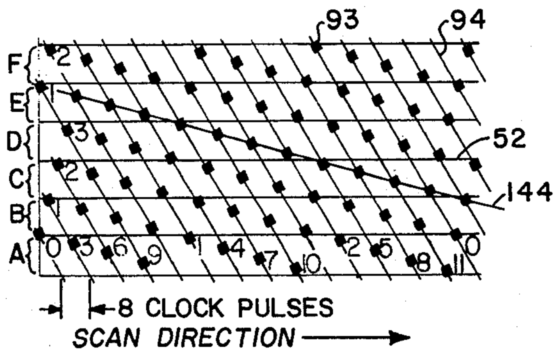
FIG. 18 shows the pattern developed by the cyan screen circuit.

Each dot character generator 43, 44, 45 and 46 is composed of a cathode ray tube 47 and a lens 48 in a suitable housing 53. Each lens 48 is positioned to focus the image of the front face of its CRT 47 on to the photographic film 29, 30 31 or 32 as shown in FIG. 2. The direction arrows and letters V and H refer to the vertical and horizontal deflection direction of the cathode ray tube. The angle identified as $\beta$ is the deflection angle or the angle between the direction of scanning and the vertical deflection direction of the cathode ray tube. The dot character 93 shown in FIG. 2 is representative of all dot characters made in any of the patterns of FIGS. 13, 14, 15, 16, 17 and 18. The cathode ray tube 47 in dot generator 43 is aligned such that the vertical deflection in its image on film 29 is rotated at an angle of $\beta$ equals 45°. Film 29 will be the yellow separation component of the input copy 28. The cathode ray tube 47 in dot generator 44 is aligned such that the vertical deflection in its image on film 30 is rotated at an angle of $\beta$ equals 90°. Film 30 will be the black separation component of the input copy 28. The cathode ray tube 47 in dot generator 45 is aligned such that the vertical deflection in its image on film 31 is rotated at an angle of $\beta$ equals plus 60°. Film 31 will be the magenta separation component of the input copy 28. The cathode ray tube 47 in dot generator 46 is aligned such that the vertical deflection in its image on film 32 is rotated at an angle of $\beta$ equals minus 60°. Film 32 will be the cyan separation component of the input copy 28. The pattern generated on the yellow separation film 29 is shown in FIG. 15. The pattern generated on the black separation film 30 is shown in FIG. 16. The pattern generated on the magenta separation film 31 is shown in FIG. 17. The pattern generated on the cyan separation film 32 is shown in FIG. 18. These patterns, FIGS. 15, 16, 17 and 18 will subsequently be described in more detail.

A magnetic pickup head 54 is mounted on the base 33 adjacent to one edge of drum 25. Magnetic tape strip 55 is wrapped around the same edge of drum 25 and attached thereto in a manner that will allow a signal recorded thereon to be detected by magnetic pickup head 54 as the drum 25 rotates. A photocell pickup 56 is mounted to base 33 adjacent to the opposite edge of drum 25. Tab 57 is attached to drum 25 in a manner such that rotation of drum 25 causes tab 57 to pass through photocell pickup 56 and be detected thereby.

A light tight box 58 with lid 59 is attached to base 33. Suitable light traps 60 and 61 are incorporated in box 58 so that shaft 22 and slide 40 may pass through the side of box 58 without admitting outside light thereto.

Magnetic tape strip 55 is recorded with a series of pulses. The repetition rate of the pulses is such that 10 pulses occur while the drum 25 rotates a distance such that the photo sensor 42 has scanned a distance equal to the reciprocal of the screen size being generated. That is, if 120 line screens are being produced on films 29, 30, 31 and 32; then 10 pulses are detected by magnetic pickup 54 while the photo-sensor 42 scans one one hundred and twenty hundredths inch. This series of pulses detected by the magnetic pickup head is referred to as the 'clock pulse'. The photocell pickup 56 detects the presence of the tab 57 once for each full revolution of the drum 25. The output of this photocell pickup 56 is referred to as the 'start pulse'. This start pulse is timed to occur when the photo sensor 42 is sensing an area outside the image on input copy 28.

The pitch of the threaded shaft 34 and the ratio of sprockets 27 and 37 are selected to cause the slide 40 to move the reciprocal of the generated screen size for each full revolution of drum 25. That is, if the 120 line screens are being produced on films 29, 30, 31 and 32; the slide 40 will move one one hundred and twenty hundredths inch for each full revolution of drum 25. Any screen size can be made by having the threaded shaft 34 and the magnetic tape strip 55 made to fit the described parameters.

The following circuit descriptions are made in conjunction with FIGS. 3, 4, 5, 6, 8, 9, 10 and 11. The circuit diagrams have been made in block form assuming the use of digital logic. Multiple connections necessary for the binary transfer of information from one block to another have not been shown in order to simplify the drawings. The counters and registers are state of the art components that have the capability of being reset to zero or preset to an input state as required by the circuit. The detect circuits are state of the art digital devices that could be either assemblies of standard logic gates or read-only-memories that give an output only on specific inputs. Any one skilled in the state of the art can readily see that the functions of the individual circuits could also be obtained with analog circuits. The descriptions in this invention are intended to include the use of analog circuitry to perform the functions described.

Figure 3:
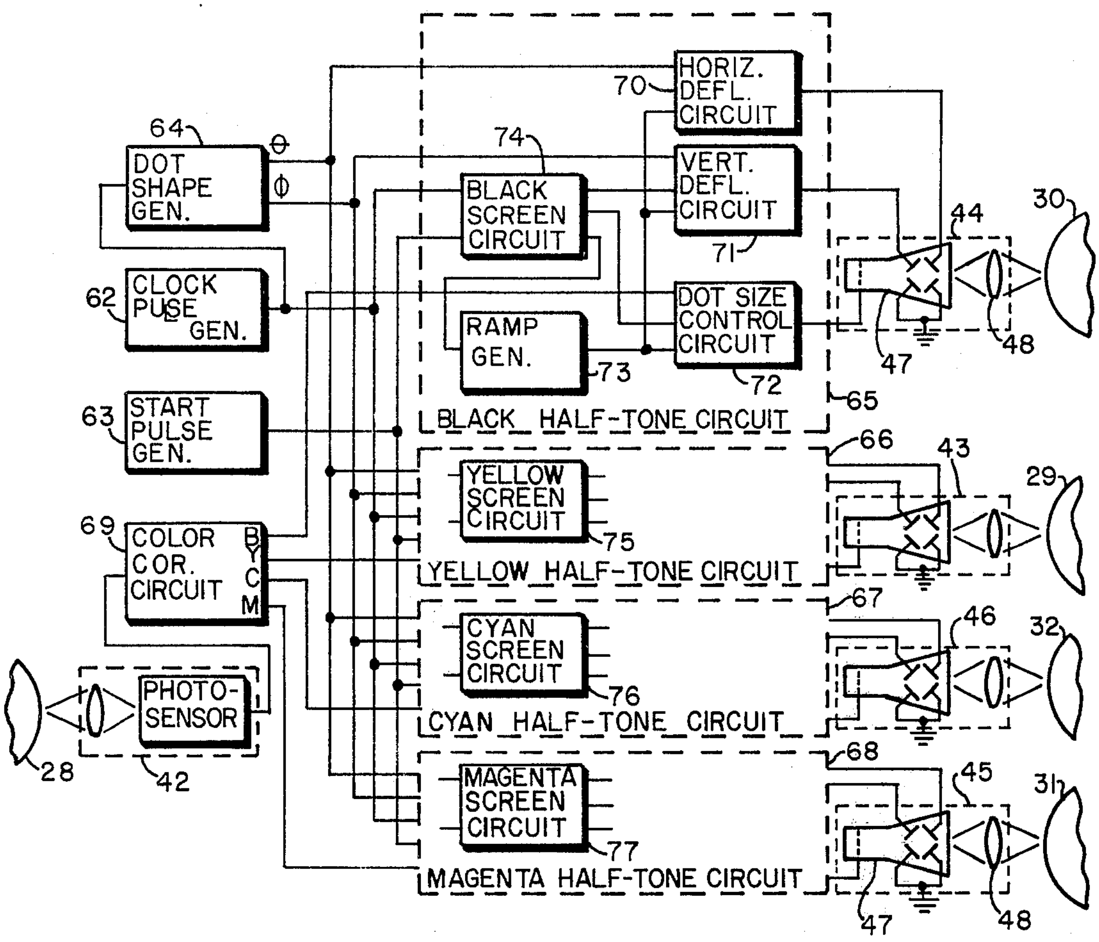
FIG. 3 shows a block diagram of the electronic functions required to make the scanning machines operative.

Refer now to FIG. 3 for the electrical block diagram of the system. The clock pulse generator 62 receives the pulses picked up by the magnetic pickup head 54 and amplifies them to a level suitable for use as an electronic timing pulse. The start pulse generator 63 receives the start pulse from photocell pickup 56 and amplifies it to a level suitable for use as an electronic timing pulse.

Figure 12:
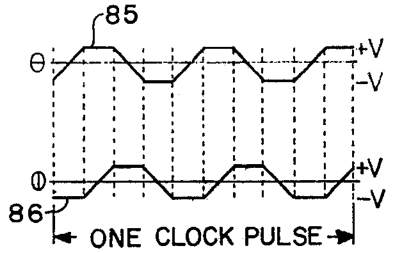
FIG. 12 shows the waveform outputs of the 'dot shape generator circuit'.

The dot shape generator 64 receives an input from the clock pulse generator 62 and generates two trapezoidal wave shapes 85 and 86 that are ninety degrees out of phase as shown in FIG. 12.

The color correction circuit 69 receives its input from the photo sensor 42 and generates outputs that represent the densities of yellow, black, magenta and cyan inks that are required to reproduce the color on a particular scanned spot of the input copy 28.

Each of the half-tone circuits; black 65, yellow 66, cyan 67 and magenta 68 receives inputs from the dot shape generator 64, the clock pulse generator 62, the start pulse generator 63 and the color correction circuit 69. Each of the half-tone circuits 65, 66, 67 and 68 are composed of a horizontal deflection circuit 70, a vertical deflection circuit 71, a dot size control circuit 72, a ramp generator 73 and a screen circuit 74, 75, 76 or 77. Each is connected as shown in FIG. 3 black half-tone circuit 65.

The screen circuits 74, 75, 76 and 77 each have two inputs (clock pulse and start pulse) and three outputs (ramp pulse, dot form pulse and dot deflection level). The screen circuits 74, 75, 76 and 77 will be described subsequently in the descriptions of FIGS. 8, 9 and 10.

Figure 11:
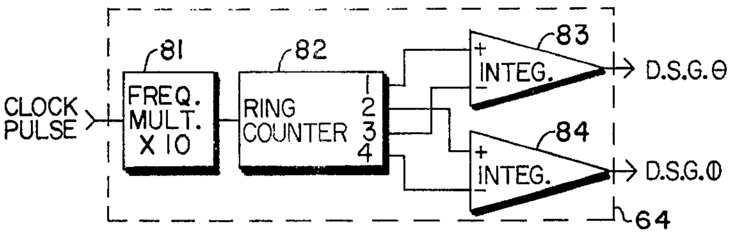
FIG. 11 shows the 'Dot Shape generator circuit' in block diagram.

The dot shape generator 64 is detailed in FIG. 11. The clock pulse is received by the frequency multiplier 81 and is multiplied in frequency by a factor of 10 to generate a high speed pulse. This high speed pulse is received by the ring counter 82. The output of the ring counter is always high at only one of its outputs 1, 2, 3 or 4. The high output changes sequentially through outputs 1, 2, 3 and 4 coincident with the rate of the high speed pulse input. Integrator 83 receives the ring counter 82 outputs 1 and 3 at its positive and negative inputs respectively while integrator 84 receives ring counter 82 outputs 2 and 4 at its positive and negative inputs respectively. The output of integrator 83 is referred to as D.S.G.$\theta$. The output of integrator 84 is referred to as D.S.G.$\phi$. FIG. 12 shows the waveshape 85 of D.S.G.$\theta$. and waveshape 86 of D.S.G.$\phi$. It can be seen that as waveshape 85 is used for the vertical deflection of a cathode ray tube while waveshape 86 is used for the horizontal deflection, a square trace is described by the electron beam of the cathode ray tube. The use of this square trace will be described subsequently in the description of the horizontal deflection circuit 70 and the vertical deflection circuit 71 of FIG. 3.

The horizontal deflection circuit 70, the vertical deflection circuit 71, the dot size control circuit 72 and the ramp generator circuit 73 will all be described in relation to the black half-tone circuit 65 with the understanding that duplicate circuits of each of them perform the identical functions in the yellow half-tone circuit 66, the cyan halftone circuit 67 and the magenta half-tone circuit 68.

Figure 7:
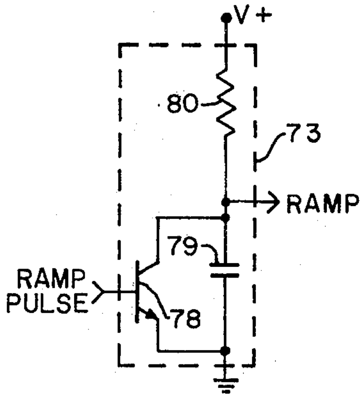
FIG. 7 shows the schematic of 'ramp generator circuit'.

The ramp pulse is received from the black screen circuit 74 by the ramp generator 73. Referring now to FIG. 7, the ramp pulse is applied to the base of transistor 78 causing it to saturate and discharge capacitor 79. When the ramp pulse is removed capacitor 79 is charged through resistor 80 by the charging voltage V+. The action of this circuit causes a sawtooth voltage waveform to appear at the 'ramp' output of the ramp generator 73. The ramp sawtooth voltage will have the same frequency as the ramp pulse due to the action of this circuit.

Figure 4:
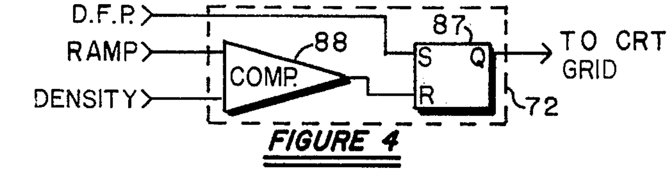
FIG. 4 shows the 'Dot size control circuit' in block diagram.

The dot size control circuit 72 is detailed in FIG. 4. The dot form pulse, referred to as D.F.P., is received from the black screen circuit 74 and is applied to the S input of flip-flop 87 causing its output Q to go high thereby unblanking the electron beam of cathode ray tube 47. The comparator 88 compares the density voltage received from the color correction circuit 69 with the ramp voltage received from the ramp generator 73. When the ramp voltage goes higher than the density voltage the output of the comparator 88 sends a high signal to the R input of flip-flop 87 thereby resetting its Q output to a low state and blanking cathode ray tube 47. The action of this circuit results in the electron beam of cathode ray tube 47 being unblanked for a period of time during each dot forming sequence that is proportional to the density input to the dot size control circuit 72.

Figure 5:
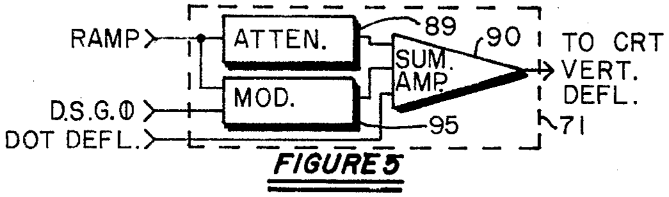
FIG. 5 shows the 'Vertical deflection circuit' in block diagram.

The vertical deflection circuit 71 is detailed in FIG. 5. It receives the ramp input from the ramp generator 73, the D.S.G.$\phi$ input from the dot shape generator 64 and the dot deflection input from the black screen circuit 74. The attenuator 89 supplies an attenuated ramp signal to summing amplifier 90 to deflect the electron beam of cathode ray tube 47 in a manner that compensates for the motion of film 30 during dot formation. FIG. 2 shows the initial image 91 of cathode ray tube 47 moving a distance X to its final position 92 during the formation of dot 93 on film 29, 30, 31 or 32. It can be seen that for the black half-tone circuit 65, attenuator 89 output would be zero since the axis of the cathode ray tube 47 for the black circuit is aligned with the vertical deflection axis 94 at an angle $\beta$ equals 90° from the scan direction 52 and therefore no compensation is required in the vertical direction to compensate for the travel of film 30. All other half-tone circuits 66, 67 and 68 will have an output from attenuator 89 to provide compensation.

The modulator 95 of the vertical deflection circuit 71 in FIG. 5 modulates the D.S.G.$\phi$ signal from the dot shape generator 64 with the ramp signal from ramp generator 73. The output of modulator 95 is the trapezoidal waveshape 86 with its peak amplitude increasing from zero to some fixed maximum level determined by the peak voltage of the modulating ramp voltage.

The summing amplifier 90 adds the signals from attenuator 89, modulator 95 and the dot deflection input from black screen circuit 74 to provide a composite deflection voltage to the vertical plates of cathode ray tube 47.

Figure 6:
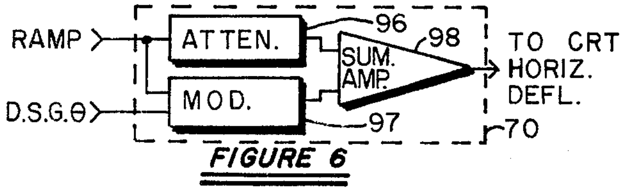
FIG. 6 shows the 'Horizontal deflection circuit' in block diagram.

The horizontal deflection circuit 70 is detailed in FIG. 6. The attenuator 96 performs the same function as the attenuator 89 in the vertical deflection circuit 71. The modulator 97 modulates the D.S.G.$\theta$ signal from the dot shape generator 64 with the ramp from ramp generator 73. The summing amplifier 98 adds the outputs of attenuator 96 and modulator 97 to provide a composite deflection voltage to the horizontal plates of cathode ray tube 47.

The modulator 95 and 97 inputs into the summing amplifiers 90 and 98 cause the electron beam of cathode ray tube 47 to trace a square dot of the shape 93 shown in FIG. 2. The electron beam of CRT 47 is focused to provide a beam size that will provide an overlap on the lines of dot 93 as shown in FIG. 2 such that the dots 93 are formed as solid square dots on film 30. The attenuators 89 and 96 inputs into summing amplifiers 90 and 98 cause the square shape 93 to remain in proper position on the film 30 as the cathode ray tube image scans from position 91 to position 92 of FIG. 2. The dot deflection input into summing amplifier 90 causes the formed dot to be deflected to the proper lattice position to form the pattern shown in FIG. 16.

Figure 8:
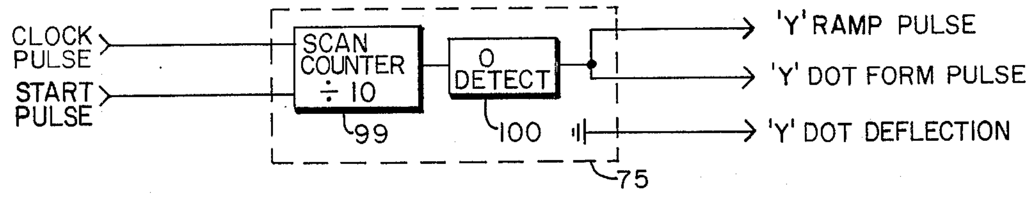
FIG. 8 shows the 'yellow screen circuit' in block diagram.

The yellow screen circuit is detailed in FIG. 8. The clock pulse is counted by the scan counter 99. The range of scan counter 99 is 10 units, therefore after each set of 10 clock pulses the output of the counter 99 returns to zero. Zero detect circuit 100 gives a high output every time the scan counter output is zero. This output is the 'Y' ramp pulse and the 'Y' dot form pulse shown in FIG. 8. Referring to FIG. 15 it can be seen that the yellow screen circuit causes a dot 93 to be formed for each increment of 10 clock pulses along each scan axis 52. There is no dot deflection from the scan axis 52 because the 'Y' dot deflection signal is connected to ground as shown in FIG. 8. The start pulse input into scan counter 99 resets the output of the scan counter to zero at the beginning of each scan line to insure that the formed dots 93 are properly aligned on the vertical axis 101.

Figure 9:
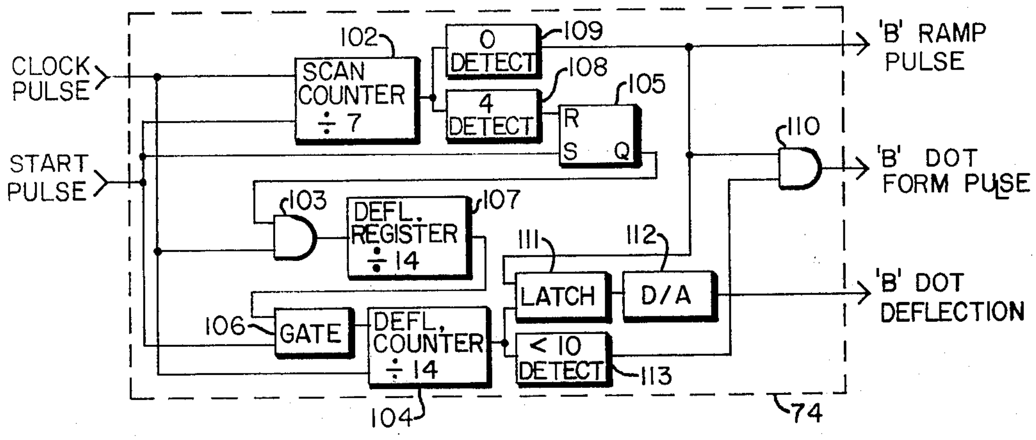
FIG. 9 shows the 'black screen circuit' in block diagram.

The black screen circuit 74 is detailed in FIG. 9. The clock pulse is connected to the input of the scan counter 102, the AND gate 103 and the deflection counter 104. The start pulse is connected to the reset input of scan counter 102, the set input of flip-flop 105, and the enable input of gate 106 causing counter 102 to reset to zero, flip-flop 105 output Q to go high and gate 106 to preset counter 104 to the accumulated count of deflection register 107. As the clock pulse continues after the start pulse, four detect circuit 108 resets flip-flop 105 after four clock pulses thereby limiting the clock pulse count into register 107 through AND gate 103 to a total of four counts between start pulses. Scan counter 102 has a range of seven units and therefore resets itself to zero on every 7th clock pulse. This reset to zero is detected by zero detector 109 to give a 'black ramp pulse' output, an input to AND gate 110 and an input to latch 111. At the application of the zero detect pulse to the input of latch 111 the output of latch 111 is made to be the same as its input from the deflection counter 104 and remains at this output until another zero detect pulse is received. The digital output of latch 111 is connected to the input of digital to analog converter 112 whose output is the analog voltage required to deflect the electron beam of cathode ray tube 47 in the increments required for generating the pattern of FIG. 16. The deflection counter 104, having a range of 14 units, counts each clock pulse and resets to zero every 14th clock pulse. The less than 10 detector 113 has a high output whenever the digital output of counter 104 is less than ten. The output of detector 113 and detector 109 are inputs to the AND gate 110 to provide a 'black dot form pulse' at each zero count of counter 102 if the count in counter 104 is less than 10.

Refer now to FIG. 16 for the physical function of the circuit just described. Line A is the first line scanned from left to right along the direction of scan axis 52. The deflection counter 104 and scan counter 102 both started off at zero, so a dot 93 is formed at the position marked 0. After seven clock pulses, the deflection counter has 7 counts and the scan counter resets to zero to form a dot 93 at the position marked 7. After 14 pulses the deflection counter resets to zero at the same time the scan counter resets to zero so another dot 93 is formed at zero deflection along the scan axis base line. This pattern continues through scan line A with dots 93 being formed on every seventh clock pulse with the deflection alternating between zero and seven units. The deflection units are established such that ten units of deflection is equal to the width of the scan line A.

At the beginning of scan line A four counts were received by the deflection register 107. As the start pulse starts the scanning of line B these four counts are transferred into the deflection counter 104 and the scan counter 102 is reset to zero. Therefore, the first dot 93 formed in line B is at four units of deflection at the point marked 4. After seven more clock pulses the scan counter resets to zero but no dot is formed because the deflection counter 104 output is at 11 counts causing the less than 10 detect circuit 113 to inhibit AND gate 110 from passing the output of zero detect circuit 109 as a dot form pulse. Line B then is formed with a dot every 14 pulse at a deflection of 4 units. It can be seen that by continuing the logic presented that the pattern of FIG. 16 will be generated with the circuit of FIG. 9.

Figure 10:
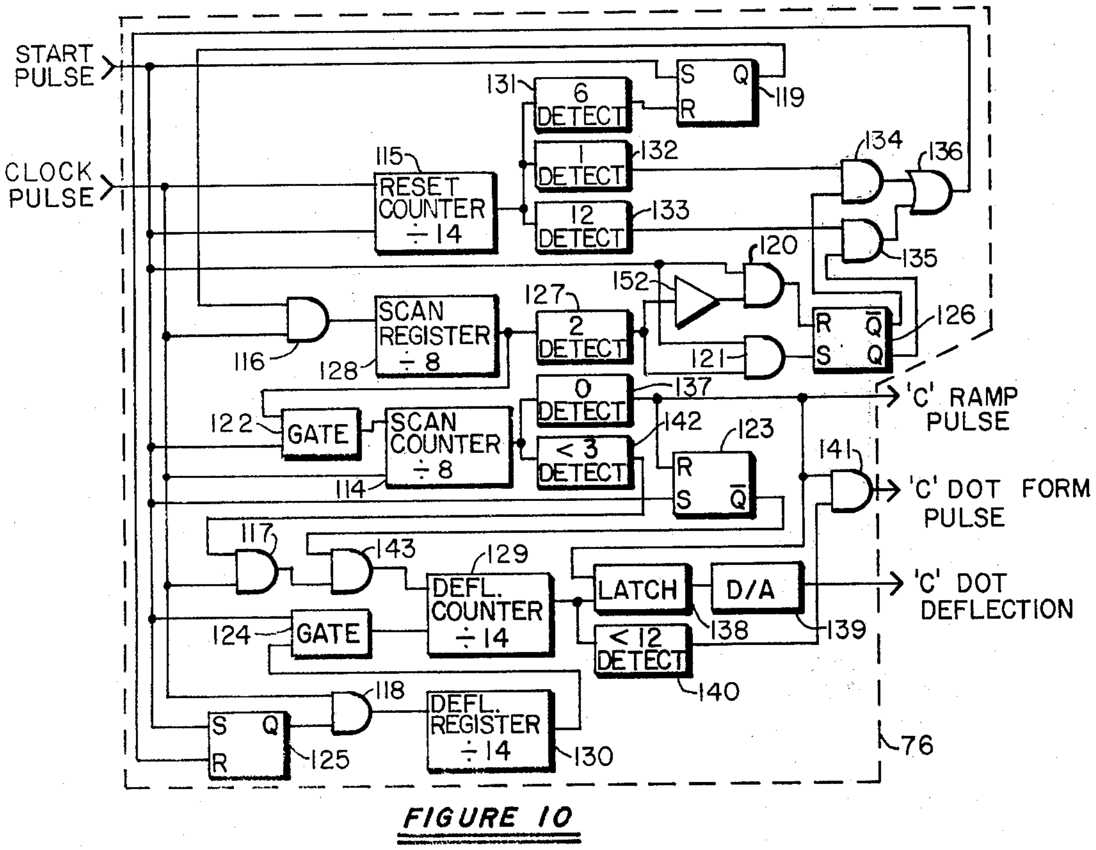
FIG. 10 shows the 'cyan screen circuit' in block diagram.

The cyan screen circuit 76 is detailed in FIG. 10. The clock pulse is connected to the input of the scan counter 114, the input to the reset counter 115, an input of AND gate 116, an input of AND gate 117 and an input of AND gate 118. The start pulse is connected to the set input of flip-flop 119, the reset input of reset counter 115, an input of AND gate 120, an input of AND gate 121, the trigger input of gate 122, the set input of flip-flop 123, the trigger input of gate 124 and the set input of flip-flop 125. A start pulse then causes flip-flop 119 Q output to go high, causes reset counter 115 to be reset to zero, causes flip-flop 126 to be set or reset through gates 120 or 121 depending on the output of 2 detect circuit 127, causes scan counter 114 to be preset to the accumulated count of scan register 128 through gate 122, causes the $\bar{Q}$ output of flip-flop 123 to go low, causes the deflection counter 129 to be preset to the accumulated count of deflection register 130 through gate 124 and causes flip-flop 125 output Q to go high.

As the clock pulse continues, 6 detect circuit 131 resets flip-flop 119 after six clock pulses and causes AND gate 116 to inhibit the clock pulse input to scan register 128. This action causes the scan register 128 to add exactly six counts to its previous total after each start pulse. The scan register 128 is allowed to have only even numbered accumulated counts, that is 0, 2, 4 or 6. The addition of six units after each reset pulse effectively causes the scan register to count backwards by units of two through the sequence 6, 4, 2, 0, 6, 4, etc.

The 2 detect circuit 127 has a high output whenever the output of scan register 128 equals two. The output of 2 detect 127 is connected to AND gate 121 and through inverter 152 to AND gate 120. The action of this circuit causes the start pulse to set flip-flop 126 if the scan register 128 totals two counts or causes the start pulse to reset flip-flop 126 if the scan register totals zero, four or six counts.

The 1 detect circuit 132 and the 12 detect circuit 133 from reset counter 115 are connected to AND gates 134 and 135 with the Q and $\bar{Q}$ outputs of flip-flop 126. The outputs of AND gates 134 and 135 are connected to the inputs of OR gate 136. OR gate 136 provides the reset for flip-flop 125. The function of the circuit just described is to limit the number of clock pulses counted by deflection register 130 after each start pulse. If the scan register 128 has an accumulated count of two at the time of the start pulse, deflection register 130 will receive exactly 12 of the following clock pulses. If the scan register 128 has an accumulated count of zero, four or six the deflection register 130 will receive exactly one of the following clock pulses. Since the deflection register 130 has a range of fourteen counts, the addition of 12 counts is equivalent to subtracting two counts.

The 0 detect circuit 137 on the output of scan counter 114 provides the cyan ramp pulse. This cyan ramp pulse is connected to the trigger input of latch 138 and causes latch 138 to store the output of deflection counter 129 until the next cyan ramp pulse is formed. The output of latch 138 is connected to the digital to analog converter 139 whose output is the analog voltage required to deflect the electron beam of cathode ray tube 47 in the increments required to generate the pattern of FIG. 18. The cyan ramp pulse and the output of <12 detect circuit 140 are connected to the inputs of AND gate 141, whose output provides the cyan dot form pulse.

The <3 detect circuit 142 provides an output that enables AND gate 117 to provide three clock pulses of every eight to deflection counter 129. Flip-flop 123 provides an output that disables AND gate 143 from providing pulses to the deflection counter 129 until the scan counter has reached a zero count after a start pulse. This circuit is necessary to prevent erroneous counts from reaching the deflection counter before the first dot 93 of a scan line is formed.

Refer now to FIG. 18 for the physical function of the circuit just described. Line A is the first line scanned from left to right along the direction of scan axis 52.

Cathode ray tube 47 is aligned so that its vertical deflection axis deflects along the direction of deflection axis 94. The increments of deflection are established electronically such that 12 equal units of deflection equal the length along axis 94 between any adjacent pair of scan lines 52. The deflection direction is down, that is, for line A the zero deflection point would be on the scan axis base line 52 between scan lines A and B.

At the beginning of scan line A the deflection counter 129 and the scan counter 114 are reset to zero from the accumulated count in deflection register 130 and scan register 128. Therefore the first dot 93 is formed at the position marked 0. After eight clock pulses, the scan counter resets to zero and the deflection counter has three units so the next dot is formed at the position marked 3. Eight clock pulses later a dot is formed at 6 and then at 9. Eight clock pulses after the 9 dot is formed the deflection counter is at 12 and the <12 detect circuit 140 inhibits dot formation. Eight more clock pulses adds three to the deflection counter 129 to bring its total to one so the next dot is formed at the position in line A marked 1. This logic continues in line A with dots being formed at increments of eight clock pulses at the deflection positions 0, 3, 6, 9, -, 1, 4, 7, 10, -, 2, 5, 8, 11, 0, 3, 6, etc.

During the scanning of line A the deflection register 130 receives one count to bring its total to one and the scan counter receives six counts to bring its total to six.

At the end of line A the start pulse causes the deflection counter 129 to be preset to the count of one from the deflection register 130 and causes the scan counter 114 to be preset to the count of six from the scan register 128. The first dot 93 formed in line B then is after two clock pulses at the position marked 1 in line B. Line B is continued with the same sequence as line A. During the formation of line D the deflection register 130 receives twelve counts rather than one, so it can be seen that by accumulating the deflection register counts of lines A, B, C and D into the deflection register 130 the first dot formed in line E will be at the position marked 1 in line E.

The magenta screen circuit 77 in FIG. 3 is the same circuit as the cyan screen circuit 76 of FIG. 10 with the following changes. The 6 detect circuit 131 of screen circuit 76 is a 2 detect circuit in circuit 77. The 1 detect circuit 132 is a 13 detect circuit, the 12 detect circuit 133 is a 2 detect circuit and the 2 detect circuit 127 is a 0 detect circuit. The magenta circuit 77 works in the same maner as the cyan circuit 76 except that after a start pulse the scan register 128 of circuit 77 receives only two clock pulses rather than the six received by the scan register 128 of circuit 76 and the deflection register 130 of circuit 77 receives either thirteen or two clock pulses rather than the one or 12 received by the deflection register 130 of circuit 76.

Refer now to FIG. 17 for the physical function of the magenta screen circuit 77. It can be seen from scan line A that the deflection count follows the same sequence that the cyan screen circuit 76 produces, that is, 0, 3, 6, 9, -,1, 4, 7, 10, -, 2, 5, 8, 11, 0, 3, 6, etc. It can be seen also that the deflection is along deflection axis 94 from the scan axis base line 52 upwards toward line B with the zero deflection point on the lower scan axis base line 52 of scan line A.

During the scanning of line A two clock pulses are counted by scan register 128 and two pulses are counted by deflection register 130. Therefore, the first dot 93 of line B is formed after six clock pulses at two units of deflection on the position marked 2 in line B. While line B is scanned two clock pulses are counted by scan register 128 and thirteen pulses are counted by deflection register 130. This causes the first dot of line C to be formed after four clock pulses at one unit of deflection on the position marked 1 in line C. By continuing with the logic it can be seen that the magenta screen circuit 77 will produce the pattern of FIG. 17.

GENERAL DESCRIPTION

Figure 13:
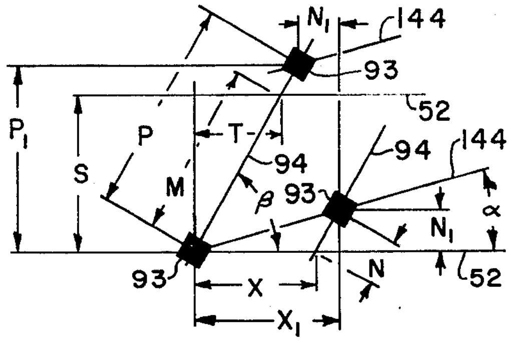

Refer now to FIG. 13 for the basic pattern geometry and matrix derivation.

94 lines are the axis lines for the dot generator deflection.

144 lines are the axis lines of the generated square matrix.

52 lines are the scan axis base lines of the dot generator scanning direction. These scan axis base lines are also referred to as arrows 52 in FIG. 1.

93 dots are dots formed by a dot generator at specific matrix points.

S is the distance between adjacent scan lines.

$\alpha$ is the screen angle, or the angle between 144 matrix axis lines and 52 scan axis base lines.

$\beta$ is the deflection angle, or the angle between 94 dot deflection axis and 52 scan axis base lines.

N is the increment of dot generator deflection between successive dots 93.

M is the distance between the base lines of adjacent scan axis base lines 52 along the deflection axis 94.

P is the distance between dots 93 on the same deflection axis line 94 in adjacent scan lines.

X is the distance along the scan axis base line 52 between successive dot generator axes 94.

T is the offset distance between dot deflection axes 94 of adjacent scan axis base lines 52.

From this basic geometry, the following equations are derived, with $\alpha$ having the constraints:

$$-45° \leq \alpha \leq +45°$$

$$\text{and when } \alpha = O \quad \frac{\alpha}{|\alpha|} = +1$$

$$\beta = \frac{\alpha}{|\alpha|}[\,|\alpha| + 45°]$$

$$T = S|\cot \beta|$$

$$M = \sqrt{T^2 + S^2}$$

$$P = S\sqrt{2}$$

$$N = S\,\frac{\sin \alpha}{\sin \beta}$$

$$X = S|\cos \alpha| - n|\cos \beta|$$

In the previous equations, cartesian coordinates are used to determine the direction of the specific distances. That is, positive numbers increase from the origin toward the right and toward the top, whereas negative numbers increase from the origin toward the left and toward the bottom. Positive angles are taken to increase counter-clockwise from the positive horizontal axis and negative angles are taken to increase clockwise from the positive horizontal axis.

If digital logic is used for control of the scanning machine the values given by the previous equations must be digitized. Digitizing merely rounds off each value to its nearest integer.

Figure 14:
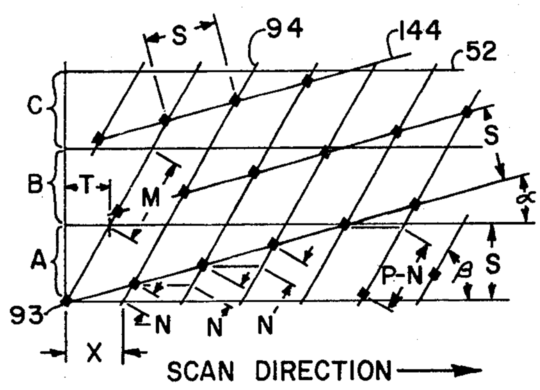
FIG. 14 shows the geometry of FIG. 13 expanded to cover a larger area of screen pattern.

Refer now to FIG. 14 for the application of the basic pattern geometry to a larger matrix. Line A is the first line formed, being formed from the left to the right. The first dot 93 is formed at the matrix origin at zero deflection after zero scan. The second dot is formed after X units of scan along the scan axis base line 52 with N units of deflection along the deflection axis 94. If the deflection units and scan units are digitized a counter with range P can be used to accumulate the total dot deflection by counting N units for each X units of scan. In the circuit of FIG. 10, this is the deflection counter 129 and P equals 14 while N equals 3.

During the scanning of line A specific incremental changes must be made to two storage registers, the scan register and the deflection register. The scan register receives an incremental change in the amount of X-T in the same direction as the direction of angle $\alpha$. That is, if $\alpha$ is positive X-T is added to the scan register and if $\alpha$ is negative X-T is subtracted from the scan register. In the specific example of the cyan screen circuit 76 of FIG. 10 the term X-T equals 2 and the angle $\alpha$ is negative. Since the range of the scan register 128 is eight, subtracting two units is equivalent to adding six. This function of the 6 detect circuit 131 and flip-flop 119 was previously described in the description of the cyan screen circuit 76 and FIG. 10.

The incremental change made to the deflection register is dependent on the value stored in the scan register and the direction of angle $\alpha$. During any scan line in which the scan register makes a transition between zero and its next lowest state the deflection register receives a change in the incremental of P-M and during all other scan lines the deflection register receives a change in the increment of P-M-N. The direction of the deflection register change shall be the same as the direction of the angle $\alpha$. When the direction of angle $\alpha$ is negative the scan register accumulates in descending order such as 0, 6, 4, 2, 0, 6 etc. and the transition between zero and its next lowest state occurs in the scan line with the scan register beginning at two. During the scanning of this line then, the deflection register changes in the increment of P-M in the negative direction. A specific example of this case is the cyan screen circuit 76 shown in FIg. 10. The description given previously of the cyan screen circuit 76 explains that when the scan register 128 has an output of two during a start pulse that the deflection register 130 receives an input of 12 clock pulses during the successive scan line. Since the deflection register 130 has a range of fourteen counts, the addition of twelve is equivalent to subtracting two. These two subtracted clock pulses are equal to P-M in this example. By referring to the previous description of screen circuit 76, it can be seen that, during scan lines starting with the scan register 128 having some output other than two, one clock pulse is added to the deflection register 130. In this example, the increment P-M-N equals minus 1. Since the angle $\alpha$ is negative in this example and the increment P-M-N is also negative the subtraction of this negative increment results in the addition just described.

It can be readily seen that the circuit of FIG. 10 can be used to produce a screen pattern of any desired angle by changing the ranges of the counters and registers and the levels of the detectors to the following values:

The scan register 128 and scan counter 114 shall each have a range equal to X.

The deflection register 130, deflection counter 129 and the reset counter 115 shall each have a range equal to P.

The detect circuit 131 shall detect the output X-T for positive $\alpha$ or T for negative $\alpha$.

The detect circuit 132 shall detect the output 2P-M-N for positive $\alpha$ or minus P-M-N for negative $\alpha$.

The detect circuit 127 shall detect the output zero for positive $\alpha$ or X-T for negative $\alpha$.

The detect circuit 142 shall detect all outputs less than N.

The detect circuit 140 shall detect all outputs less than M.

In the description previously given of the preferred embodiment S was arbitrarily assigned the value of 10. This is the number of clock pulses that occur during scanning a distance along the scan axis base line 52, said distance being equal in length to the distance between adjacent scan axes base lines. Using S equal to 10 produces the specific patterns described with angular accuracy within one-fourth° and lineal accurancy within 3 percent of the patterns in present commercial use.

The precision of the developed pattern is a function of the value assigned to S. As S increases the relative precision of the pattern improves. However, the complexity of the control circuitry increases with increasing S and the improvements achieved by the increase in complexity are not discernable.

Applying the equations to the patterns of the preferred embodiment with S equal to 10 and digitizing the values to their nearest integers gives for the zero degree screen:

| | |
|---|---|
| $\beta = 45°$ | $T = 10$ |
| $N = 0$ | $X = 10$ |
| $M = 14$ | $P = 14$ |

For the plus 15° screen:

| | |
|---|---|
| $\beta = 59°2'$ | $T = 6$ |
| $N = 3$ | $X = 8$ |
| $M = 12$ | $P = 14$ |

For the minus 15° screen:

| | |
|---|---|
| $\beta = -59°2'$ | $T = 6$ |
| $N = 3$ | $X = 8$ |
| $M = 12$ | $P = 14$ |

For the 45° screen:

| | |
|---|---|
| $\beta = 90°$ | $T = 0$ |
| $N = 7$ | $X = 7$ |
| $M = 10$ | $P = 14$ |

In the case of the zero degree screen the fact that X-T equals zero shows that there is no offset between dot deflection axes in adjacent scan lines and the fact that N equals zero shows that there is no dot deflection. Therefore the screen circuit required to produce the zero° screen is a special case that simplifies to the circuit shown in FIG. 8.

In the case of the 45° screen the fact that X-T equals X shows that the offset between dot deflection axes in adjacent scan lines is equal to the spacing between dots. This means that the scan counter can be reset to zero by the start pulse that begins each scan line and that the deflection register receives a count of P-M in each scan line. Therefore, the screen circuit required to produce the 45° screen is a special case that simplifies to the circuit shown in FIG. 9.

It can be seen by anyone skilled in the art that the techniques of this invention could be used as well with a scanning machine that reciprocates over a flat original and flat separations. Rather than basing the location of the first dot in each line in relation to the first dot in the previous line, the logic could readily be set up to locate the first dot of each line from the last dot of the previous line. Such a scanner would be useful in scanning originals that can not be conveniently wrapped around a drum for scanning.

The photo sensor and dot generators of such a system would be mounted in relation to the original and separations in a manner that would allow relative travel in the X and Y directions to accomplish the scanning and reproduction of the entire image.

It can readily be seen by anyone skilled in the art that the rotated screen patterns described in this invention could also be made by deflecting the dot character generators along a path perpendicular to the direction of scanning. Referring to FIG. 13 it can be seen that the deflection counter 129 of FIG. 10 would have the range of $P_1$ and would be increased by increments of $N_1$ between the forming of successive dots. The scan counter 114 of FIG. 10 would have the range $X_1$ and would also be reset to zero with its output of $N_1$ each time the deflection counter 129 resets to zero.

Where:

$X_1 = S \cot \alpha$ $N_1 = S \sin \alpha$ $P_1 = P \sin \beta$.

This method is not preferred because of the more complex logic required and the fact that the last dot character formed before each reset of the deflection counter 129 to zero has a smaller increment of time in which to be formed.

DEFINITIONS

"In scale to" refers to the comparison of dimensions between two or more similar but separate geometric shapes. The shapes would be in scale to each other if they are identical in form and of the same size or different sizes. An example is that a photographic enlargement is in scale to the negative from which it was exposed.

Matrix is a set of points in an ordered array. Said points to be at the intersections of two sets of parallel equidistant lines orthogonally intersecting each other. A square matrix is formed when both sets of equidistant lines have the same spacing. A rectangular matrix is formed when the two sets of equidistant lines have different spacing. An axis of a matrix can be any one of the equidistant lines.

Half-tone is an image comprised of various sized dots with each dot located on a point of a matrix. The size of each said dot is to be such as to represent the density of said image at its respective matrix point so that when viewed from a distance the half-tone appears as a continuous tone image.

Screen size is the size of the matrix used in the formation of a half-tone image and refers to the number of parallel matrix lines per inch along a line perpendicular to said parallel lines.

Screen angle is the angle of rotation between a half-tone matrix axis and some common reference axis of an image.

Color original means any multi-color image with transparent or reflective qualities. For example, color transparencies, color photographs, color negatives, sketches, oil paintings, textiles, tiles, wallpaper, and printed reproductions are included in this definition. However, this definition is not restricted to include only these examples.

Color separation is meant to define a monochromatic image that represents the color density and distribution of one color of a set of primary colors comprising a color original. A complete set of color separations is a set which is capable of reproducing said color original by superimposing said primary colors in the densities and distributions represented by said color separations of each primary color. Said color separations can be either positive or negative.

Image receiving sheet means any sheet or plate that is capable of receiving information from a dot generator source. Examples include photographic film, lithographic plates, gravure plates, deformable plastic sheets, metal plates and paper sheets. This definition is not restricted to include only these specific examples.

Dot character generator is a means of forming dot characters on an image receiving sheet. Examples include a cathode ray tube with appropriate focusing optics, a modulated laser, a vibrating stylus, a modulated arc light and an electrostatic ink dot accelerator. This definition is not intended to be restricted to only these examples given. The dot generator as defined shall be capable of being modulated from an external source so that a half-tone image can be produced by varying the size of the formed dots in an array.

Color separation screen is a half-tone image of a color separation. Said half-tone image may be on any image receiving sheet in either a positive or a negative image.

Clock pulse is one of a repetitive series of electronic plses occurring at equal intervals in time or space.

Meaning of abbreviations used in the figures:

AMP - amplifier
ATTEN - attenuator
B - black
C - cyan
COMP - comparator
COR - correction
CRT - cathode ray tube
D.F.P. - dot form pulse
D.S.G. - dot shape generator
DEFL - deflection
FREQ. MULT - frequency multiplier
GEN - generator
HORIZ - horizontal
INTEG - integrator
M - magenta
MOD - modulator
SUM - summing
VERT - vertical
Y - yellow

What is claimed is:

1. An apparatus for producing an approximately square matrix of dot characters on an image receiving sheet comprising first means for generating individual dot characters on said image receiving sheet, second means for scanning said image receiving sheet with said first means in some orderly scanning pattern, third means for deflecting said dot characters in a linear direction at some fixed angle with respect to the direction of said scanning, where said linear direction of deflection is rotated at some specific angle that is within 2° of 45° in the plane of said image receiving sheet from an axis of said square matrix, where said square matrix is rotated at some other fixed angle in the plane of said image receiving sheet from the direction of said scanning and fourth means for controlling said first means and third means in an amount of said deflection and in the timing of said dots.

2. A scanning apparatus for producing half-tone images with screen axes rotated at some fixed angle from the direction of scanning comprising:

means for generating individual dot characters on an image receiving sheet in various sizes corresponding to various density levels;

means for deflecting said dot characters in increments along a linear path rotated at some specific angle that is within 2° of 45° from the rotated axis of said half-tone screen; and means for controlling the increments of deflection and the timing of the formation of said dot characters.

3. A method for reproducing continuous tone images in half-tone copy comprising steps for:

scanning a continuous tone image and providing density level signals representative of the density levels encountered during scannning;

forming individual dot characters on an image receiving sheet with a dot character generator, said dot character generator having a motion with respect to said image receiving sheet with said motion following a pattern that is in scale to the pattern of the scanning of said continuous tone image, said dot characters being deflected in increments along a linear path whose direction is at some fixed angle from the direction of said motion;

controlling the size of said dot characters in relation to said density levels to produce a half-tone reproduction of said continuous tone image; and controlling the increments of deflection and the timing of the generation of said dot characters to produce an approximately square pattern half-tone screen whose axis is rotated at some specific angle that is within 2° of 45° from the direction of said dot character deflection.

4. A scanning method for generating a matrix of dots whose axis is rotated at an angle $\alpha$ from the direction of said scanning using a deflectable dot character generator whose deflection axis is rotated at an angle $\beta$ from the direction of said scanning and comprising the steps for:

forming dot characters at repetitive intervals X along the direction of scanning;

deflecting said dot characters along said deflection axis in equal additive increments N between the formation of said dot characters, and reversing the direction of deflection in the amount P-N between two successive dot characters when the first of the said two successive dot characters is generated at a deflection angle to or exceeding P-N;

locating the first dot character of each scan line from the position of the first dot character of the previous scan line with a relative change in the interval of T along the scan direction and a relative change in the interval of P-M or P-M-N in the deflection direction as necessary to form an approximately square pattern of dots whose axis is rotated at the angle $\alpha$ from the direction of said scanning;

where, for any desired screen angle $\alpha$, the specific values referred to above may be derived from the equations:

$$\beta = \frac{\alpha}{|\alpha|}[\,|\alpha| + 45°\,];$$
$$T = S|\cot \beta|;$$
$$M = \sqrt{T^2 + S^2};$$
$$P = S\sqrt{2};$$
$$N = S\frac{\sin \alpha}{\sin \beta};$$
$$X = S|\cos \alpha| - n|\cos \beta|;$$

and, S is the distance between adjacent scan lines;

$\alpha$ is the screen angle, or the angle between the axis of scan and the axis of the generated matrix of dot characters;

$\beta$ is the deflection angle, or the angle between the axis of scan and the dot character generator deflection axis;

N is the increment of dot character generator deflection between successive dot characters along any scan axis;

M is the distance between the base lines of adjacent scan lines along the dot character deflection axis;

P is the distance between dots on the same dot character deflection axis line in adjacent rows of scan lines;

X is the distance between the formation of dots along a given scan line; and

T is the offset distance between dot character deflection axes of adjacent scan lines.

5. A scanning method for generating a matrix of dots whose axis is rotated at an angle $\alpha$ from the direction of said scanning using a deflectable dot character generator whose deflection axis is rotated at an angle $\beta$ from the direction of said scanning and comprising steps for:

forming dot characters at repetitive intervals X along the direction of scanning;

deflecting said dot characters along said deflection axis in equal subtractive increments N between the formation of said dot characters, and reversing the direction of deflection in the amount P-N between two successive dot characters when the first of the said two successive dot characters is generated at a deflection less than N;

locating the first dot character of each scan line from the position of the last dot character of the previous scan line with a relative change in the interval of T along the scan direction and a relative change in the interval of P-M or P-M-N in the deflection direction as necessary to form a square pattern of dots whose axis is rotated at the angle $\alpha$ from the direction of said scanning;

where, for any desired screen angle $\alpha$ the specific values referred to above may be derived from the equations;

$$\beta = \frac{\alpha}{|\alpha|}[\,|\alpha| + 45°\,];$$
$$T = S|\cot \beta|;$$
$$M = \sqrt{T^2 + S^2};$$
$$P = S\sqrt{2};$$
$$N = S\frac{\sin \alpha}{\sin \beta};$$
$$X = S|\cos \alpha| - n|\cos \beta|;$$

and, S is the distance between adjacent scan lines;

$\alpha$ is the screen angle, or the angle between the axis of scan and the axis of the generated matrix of dot characters;

$\beta$ is the deflection angle, or the angle between the axis of scan and the dot character generator deflection axis;

N is the increment of dot character generator deflection between successive dot characters along any scan axis;

M is the distance between the base lines of adjacent scan lines along the dot character deflection axis;

P is the distance between dots on the same dot character deflection axis line in adjacent rows of scan lines;

X is the distance between the formation of dots along a given scan line; and

T is the offset distance between dot character deflection axes of adjacent scan lines.

6. A system for controlling a deflectable dot character generator of a scanning apparatus to produce a matrix of dot characters comprising:

scan counter for accumulating a digital input to the range of X, said scan counter resetting to zero upon reaching the range X and the continuing to accumulate said inputs from zero;

deflection counter for accumulating a digital input to the range of P, said deflection counter resetting to zero upon reaching the range P and then continuing to accumulate said input from zero;

scan input source providing digital information as required for accumulation by said scan counter, with the scan input proportional to the scanning rate of said dot character generator;

deflection input source providing digital information as required for accumulation by said deflection counter, with the deflection input at the rate of N units for every X units of the scan input;

dot character forming control providing a signal causing the said dot character to generate a dot character for each reset of said scan counter to zero;

dot character deflection control providing a signal causing said dot character to deflect in increments controlled by the output of said deflection counter;

means for presetting the scan counter to a count at the beginning of each scan line where the preset scan count is related to the preset scan count of the previous scan line by an increment T;

means for presetting the deflection counter to a count at the beginning of each scan line where the preset deflection count is related to the preset deflection count of the previous scan line by an increment P-M or P-M-N;

where, for any desired screen angle $\alpha$, the values for the variables may be found from the equations;

$$\beta = \frac{\alpha}{|\alpha|}(|\alpha| + 45°);$$
$$T = S|\cot\beta|;$$
$$M = \sqrt{T^2 + S^2};$$
$$P = S\sqrt{2};$$
$$N = S\frac{\sin\alpha}{\sin\beta};$$
$$X = S|\cos\alpha| - n|\cos\beta|;$$

and, the variables T, M, P, N and X are digitized;

and, S is the distance between adjacent scan lines;

$\alpha$ is the screen angle, or the angle between the axis of scan and the axis of the generated matrix of dot characters;

$\beta$ is the deflection angle, or the angle between the axis of scan and the dot character deflection axis;

N is the increment of dot character deflection between successive dot characters along any scan line;

M is the distance between the base lines of adjacent scan lines along the dot character deflection axis;

P is the distance between dots on the same dot character deflection axis line in adjacent rows of scan lines;

X is the distance between the formation of dots along a given scan line; and

T is the offset distance between dot character deflection axes of adjacent scan lines.

7. A system for controlling a deflectable dot character generator of a scanning apparatus to produce a matrix of dot characters comprising:

scan integrator for accumulating an analog input to the range of X, said scan integrator resetting to zero upon reaching the range of X and then continuing to accumulate said input from zero;

deflection integrator for accumulating an analog input to the range of P, said deflection integrator resetting to zero upon reaching the range P and then continuing to accumulate said inputs from zero;

scan input source providing analog information as required for accumulation by said scan integrator, with the scan input proportional to the scanning rate of said dot character generator;

deflection input source providing analog information as required for accumulation by said deflection integrator, with the deflection input at the rate of N units for every X units of the scan input;

dot character forming control providing a signal causing the said dot character generator to generate a dot character at each reset of said scan integrator to zero;

dot character deflection control providing a signal causing said dot character to deflect in amounts controlled by the output of said deflection integrator;

means for presetting the scan integrator to a level at the beginning of each scan line where the preset scan level is related to the preset scan level of the previous line by an increment T;

means for presetting the deflection integrator to a level at the beginning of each scan line where the preset deflection level is related to the preset deflection level of the previous scan line by an increment P-M or P-M-N;

where, for any desired screen angle $\alpha$, the values for the variables may be found from the equations;

$$\beta = \frac{\alpha}{|\alpha|}[|\alpha| + 45°];$$
$$T = S|\cot\beta|;$$
$$M = \sqrt{T^2 + S^2};$$
$$P = S\sqrt{2};$$
$$N = S\frac{\sin\alpha}{\sin\beta};$$
$$X = S|\cos\alpha| - n|\cos\beta|;$$

and S is the distance between adjacent scan lines;

$\alpha$ is the screen angle, or the angle between the axis of scan and the axis of the generated matrix of dot characters;

$\beta$ is the deflection angle, or the angle between the axis of scan and the dot character generator deflection axis;

N is the increment of dot character generator deflection between successive dot characters along any scan line;

M is the distance between the base lines of adjacent scan lines along the dot character deflection axis;

P is the distance between dots on the same dot character deflection axis line in adjacent rows of scan lines;

X is the distance between the formation of dots along a given scan line; and

T is the offset distance between dot character deflection axes of adjacent scan lines.

8. The system as set forth in claim 6, wherein said dot character generator includes means for controlling the size of each dot character in response to a density signal input thereby causing the matrix formed by the dot characters to be a half-tone image.

9. The system as set forth in claim 7, wherein said dot character generator includes means for controlling the size of each dot character in response to a density signal input thereby causing the matrix formed by the dot characters to be a half-tone image.

10. In a scanning system for producing a half-tone dot matrix whose axis is aligned with the axis of scanning, the combination comprising:

clock pulse generator producing clock pulses at a rate such that 10 clock pulses are produced while scanning a distance along a scan line that is equal to the distance between scan lines;

scan counter for counting pulses from said clock pulse generator and resetting to zero on each 10 pulse;

ramp generator producing a sawtooth voltage ramp whose frequency is determined by and synchronized with the zero reset of said scan counter;

dot character generator providing dot deflection along the direction parallel to the path of said scanning, said deflection being responsive to the sawtooth voltage of said ramp generator in a manner such that the dot character is deflected a distance equal to the distance along the path of said scanning that is traveled by said dot character generator during dot character forming thereby compensating for the motion of said dot character generator to maintain the position of the said dot character at a fixed point on an image receiving sheet;

means for controlling the size of each dot character responsive to a density input and controlling the timing of the generation of said dot character responsive to the zero reset of said scan counter; and start pulse generator for producing a single pulse at the beginning of each scan line that resets said scan counter to zero.

11. In a scanning system for producing a half-tone dot matrix whose axis is rotated at an angle of forty-five degrees to the axis of scanning, the combination comprising:

clock pulse generator producing clock pulses at a rate such that ten clock pulses are produced while scanning a distance along a scan line that is equal to the distance between scan lines;

scan counter for counting pulses from said clock pulse generator and resetting to zero on each seventh pulse;

deflection counter for counting pulses from said clock pulse generator and resetting to zero on each 14th pulse;

start pulse generator for producing a single pulse at the beginning of each scan line that resets the scan counter to zero and presets the deflection counter to the count stored in the deflection register;

a deflection register for counting pulses from said clock pulse generator and resetting to zero on each fourteenth counted pulse, said deflection register to counting only four said clock pulses during each scan line; and control system whereby a dot character generator is caused to form a dot character on an image receiving sheet once during each cycle of said scan counter at some deflection along an axis perpendicular to the direction of scanning with the amount of said deflection being related to the output of said deflection counter.

12. A scanning system wherein a deflectable dot character generator is caused to scan an image receiving sheet in a pattern of parallel scan lines spaced equally from each other by a distance of 10 linear units, where the deflection of the dot character is controlled in increments of the same linear units along an axis perpendicular to the direction of scanning, and with said dot character generator controlled by electronic circuitry that causes a dot character to be formed on the image receiving sheet every seventh said linear unit along each scan line with a deflection along the perpendicular axis in increments of said linear units at positions that form a dot matrix whose axis is rotated at an angle of 45° from the direction of scanning and whose matrix axis lines are separated by a distance of approximately ten linear units.

13. The system of claim 12 including means for inhibiting dot character generation when the dot character generator is deflected more than nine linear units along the deflection axis.

14. The system of claim 13 including means for controlling the size of each dot character in relation to a density input signal so that a half-tone image is formed of the dot matrix on the image receiving sheet.

15. A scanning system wherein a deflectable dot character generator is caused to scan an image receiving sheet in a pattern of parallel scan lines spaced equally from each other by a distance of 10 linear units, where the deflection of the dot character is controlled in increments of the same linear units along an axis rotated at an angle approximately 60° from the direction of scanning, and with said dot character generator controlled by electronic circuitry that causes a dot character to be formed every eighth said linear unit along each scan line with a deflection along the angulated deflection axis in increments of said linear units at positions that form a dot matrix whose axis is rotated at an angle of approximately fifteen degrees from the direction of scanning and whose matrix axis lines are separated by a distance of approximately 10 linear units.

16. The system of claim 15 including means for inhibiting dot character generation when the dot character generator is deflected more than eleven said linear units along the deflection axis.

17. The system of claim 16 including means for controlling the size of said dot characters in relation to a density input signal so that a half-tone image is formed of the dot matrix on the image receiving sheet.

18. A scanning system wherein a deflectable dot character generator is caused to scan an image receiving sheet in a pattern of parallel scan lines spaced equally from each other by a distance of S linear units, with the deflection of the dot character controlled in increments of the same linear units along an axis rotated at an angle $\beta$ from the direction of scanning, and with said dot character generator controlled by electronic circuitry that causes a dot character to be formed every X said linear units along each scan line with a deflection along the angulated deflection axis in increments of N said linear units at positions that form a dot matrix whose axis is rotated at an angle $\alpha$ from the direction of scanning and whose matrix axis lines are separated by a distance of approximately S linear units; where the variables referred to may be found from the equations:

$$\beta = \frac{\alpha}{|\alpha|}[\,|\alpha| + 45°\,];$$

$$N = S\frac{\sin\alpha}{\sin\beta};$$

$$X = S|\cos\alpha| - n|\cos\beta|;$$

and, S is the distance between adjacent scan lines;

$\alpha$ is the screen angle, or the angle between the axis of scan and the axis of the generated matrix of dot characters;

$\beta$ is the deflection angle, or the angle between the axis of scan and the dot character generator deflection axis;

N is the increment of dot character generator deflection between successive dot characters along any scan axis; and X is the distance between the formation of dots along a given scan line.

19. The system of claim 18 including means for inhibiting dot character generation when the dot character is deflected more than M-1 said linear units along the deflection axis, where:

$$M = \frac{S}{\sin \beta}$$

and;

M is the distance between the base lines of adjacent scan lines along the dot character deflection axis.

20. The system of claim 19 including means for controlling the size of said dot characters in relation to a density input signal so that a half-tone image is formed of the dot matrix on the image receiving sheet.

21. A system for simultaneously producing half-tone images for each of four subtractive primary color components of a continuous tone image comprising:

optical scanner wherein a multiple color photosensor is caused to scan a continuous tone color image in a pattern of parallel scan lines spaced equally from each other by some fixed number of linear units, where said photosensor includes circuitry that converts its output into density signals representative of the densities of each of the said four subtractive primary color components required to duplicate the color and tone of said continuous tone color image at each elemental spot scanned;

four deflectable dot character generators for scanning four separate image receiving sheets in patterns of parallel scan lines, said scan lines of each sheet spaced equally from each other by some fixed distance in scale to the distance between scan lines of said optical scanner, where the deflection of each of said dot characters is controlled in increments of linear units along individual angulated deflection axes rotated at different fixed angles from the direction of scanning, and with each of said dot character generators controlled by electronic circuitry that causes a dot character whose size is related to the density signal from said optical scanner to be formed at repetitive intervals along each scan line with each said dot character being deflected along its angulated deflection axis in increments of linear units to positions that cause each dot character generator to form an individual dot matrix whose axis is rotated at an individual fixed angle from the axis of scanning thereby producing four separate half-tone images each of which has a different angle between its axis and the direction of scanning, with each of the half-tone images having substantially the same screen size as the other half-tone images of the set.

22. A system for simultaneously producing half-tone images for each of three subtractive primary color components of a continuous tone color image comprising:

optical scanner for scanning a continuous tone color image in a pattern of parallel scan lines spaced equally from each other by some fixed number of linear units, said optical scanner to include circuitry that converts its output into separate density signals representative of the densities of each of the said three subtractive primary color components required to duplicate the color and tones of said continuous tone color image at each elemental spot scanned;

three deflectable dot character generators for scanning three separate image receiving sheets in patterns of parallel scan lines, said scan lines of each sheet spaced equally from each other by some fixed distance in scale to the distance between scan lines of said optical scanner; means for controlling the deflection of each of said dot characters in increments of linear units along individual angulated deflection axes rotated at different fixed angles from the direction of scanning; means for controlling each of said dot character generators to form a character whose size is related to one of the density signals from said optical scanner at repetitive intervals along each scan line with each said dot character being deflected along its angulated deflection axis in increments of linear units to positions that cause each dot character generator to form an individual dot matrix whose axis is rotated at an individual fixed angle from the axis of scanning thereby producing three separate dot matrix half-tone images each of which has a different angle between its axis and the direction of scanning, with each of the half-tone images having substantially the same screen size as the other half-tone images of the set.

23. The system of claim 21 including means for inhibiting each dot character generator individually when its deflection would cause a dot character to be formed outside the width of its individual scan line thereby eliminating the formation of two dot characters at any matrix position.

24. The system of claim 22 including means for inhibiting each dot character generator individually when its deflection would cause a dot character to be formed outside the width of its individual scan line thereby eliminating the formation of two dot characters at any matrix position.

25. A scanning system comprising a deflectable dot character generator for scanning an image receiving sheet in a pattern of parallel scan lines spaced equally from each other by a fixed distance of linear units; means for controlling the deflection of said dot character in increments of the same linear units along an axis perpendicular to the direction of scanning; and means for controlling said dot character generator to form dot characters at intervals in increments of said linear units along each said scan line with deflection along the perpendicular deflection axis at positions that form an approximately square dot matrix whose axis is rotated at some angle from the direction of scanning and whose square matrix dimensions are substantially equal to the dimensions between said adjacent scan lines.

26. A dot character generator for producing square shaped dot characters on light sensitive image receiving sheet comprising:

cathode ray tube with optical lenses arranged in a manner such that the image of the cathode ray tube phosphor is focused on a suitable light sensitive image receiving sheet;

ring counter having four separate output terminals connected to the inputs of two dual slope integrators;

means for generating a sawtooth electrical waveform and a pulse sequence capable of being counted by said ring counter;

modulators to modulate the output of said dual slope integrators with the said sawtooth waveform;

means for unblanking said cathode ray tube responsive to a density input from an external source; and interconnecting means for applying the modulator outputs to the vertical and horizontal drives of said cathode ray tube and the unblanking means to the grid of said cathode ray tube in a manner such that the image produced on said image receiving sheet is a square dot whose size is related to the said density input.

* * * * *